Sept. 29, 1959     J. W. C. CRAWFORD     2,906,618
PROCESS FOR PRODUCTION OF URANIUM
Filed Feb. 18, 1944
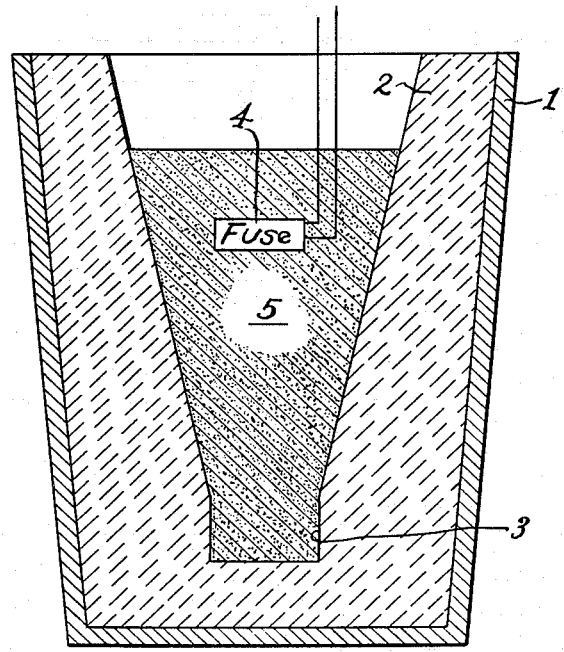
INVENTOR.
John William Croom Crawford
BY United States Patent Office 2,906,618
Patented Sept. 29, 1959

2,906,618

PROCESS FOR PRODUCTION OF URANIUM

John William Croom Crawford, Frodsham, England, assignor, by mesne assignments, to the United States of America as represented by the United States Atomic Energy Commission Application February 18, 1944, Serial No. 522,983

6 Claims. (Cl. 75—84.1)

This invention relates to improvements in the production of uranium, and to apparatus therefor.

It is known to produce refractory metals such as uranium by the autothermic reduction of a halide of the metal, such as the fluoride, with a metal such as calcium, by igniting a mixture of the compound and the metal as by means of a starch-chlorate mixture. The reduction is exothermic, and once it has been initiated it extends throughout the reaction mixture with generation of very high temperatures of the order of 1400° C. Because of the occurrence of these very high temperatures it is very difficult to find a material of construction suitable for the reaction vessel. Thus, if uranium tetrafluoride is reduced with calcium, the reaction vessel has to withstand the combined physical and chemical action of molten or vaporised calcium, calcium fluoride, uranium fluoride and uranium. Fireclay crucibles, for example, under such reaction conditions are severely corroded and may even be punctured, and, moreover, aluminium, silicon, and boron may be formed from the fireclay, and be alloyed with the uranium.

It has now been found that a suitable vessel for carrying out the autothermic reduction of a uranium halide with an alkaline earth metal is obtained by providing a containing vessel with a lining of substantial thickness of calcium fluoride. This material prevents the fused reaction mass from coming into contact with the material of the containing vessel, and good yields of high quality uranium metal are obtained.

A reaction vessel in which the present invention may be practised is illustrated in cross section in the accompanying drawing.

According to the invention there is provided a process for the production of uranium which comprises effecting the autothermic reduction of an anhydrous uranium halide with an alkaline earth metal (including magnesium) by locally bringing to reaction temperature a portion of a mixture of such reactants in an open reaction vessel having in contact with the mixture, a lining of substantial thickness composed of calcium fluoride.

It is surprising that calcium fluoride can be used satisfactorily as a lining for this purpose, since the temperature of the reaction mass certainly exceeds the fusion temperature of calcium fluoride at least temporarily, or locally. Nevertheless, it is found that although some fritting and local melting do occur, particularly in the region of the slag, fusion of the lining as a whole does not, and obviously interaction between the fused reacting mass and the refractory material of the vessel can be prevented.

In one method of making the reaction vessel, precipitated calcium fluoride or ground, good quality fluorspar, preferably substantially free from iron, is mixed with sufficient water to render the whole plastic. Usually between 5% and 10% by weight of water is sufficient for this purpose; advantageously, the water has dissolved in it an alkaline earth metal chloride, in particular calcium chloride or magnesium chloride, in amounts of the order of 1% or 2% by weight of the fluoride. It is found that such amounts of chloride assist in giving the dried lining an improved mechanical strength. The plastic, cohesive mass is then applied to the interior of a vessel of suitable size and made of a suitable material. The vessel may be of any mataerial which will withstand the high temperatures to which it will be subjected during use, and may suitably be made of steel, cast iron, or fireclay. Conveniently a former of wood, a synthetic resin such as polymerised methyl methacrylate or a chloroacrylate, or porcelain, is used to apply the plastic mass to the vessel and compress it to a firm coating. Advantageously the lining is shaped so that there is a small well at the bottom into which the metal made can run while still molten. It is thus possible both to make the metal and cast it to a suitable shape in one operation. The vessel is then dried out by heating, first at ordinary or somewhat elevated temperatures, e.g. 50° C. to 100° C., care being taken to secure even drying and thus improved mechanical strength. Finally the vessel is baked at 200° C. to 250° C. for a few hours until substantially all the water has been driven off. The extent of the heating should be at least sufficient to render the exposed surfaces of the lining substantially anhydrous. If the vessel is not to be used immediately it should be stored until required under conditions where it will not pick up moisture, since such moisture will affect the strength of the lining, and would necessitate re-baking prior to use.

The thickness of the lining necessary for successful operation will depend on the scale of the process, for some dissolution of the lining does occur at the level of the slag which forms abov the metal. We find that the amount of lining dissolved is of the order of a third the weight of the slag produced, and from this a rough estimate of a suitable thickness can be made for any given shape of crucible and size of charge. For example, in making a batch of metal weighing of the order of 40 lb., in a mild steel vessel having the normal crucible shape, a lining of 2½ to 3 inches thickness is ample.

In preparing the plastic mass used for the lining from fluorspar, the latter should preferably contain at least a proportion which is finely divided, so that the lining is not unduly porous and friable. Thus while as much as 55% of the ground material may be such as will be retained on a 150 mesh B.S.F. sieve, an amount of the order of 15% to 25% should be fine enough to pass a 300 mesh B.S.F. sieve, and preferably the material contains an even higher proportion of this finely divided material. An alternative method of obtaining a stronger lining is to mix with ground fluorspar 15% to 30% of precipitated calcium fluoride, such as may be obtained by adding hydrofluoric acid or a soluble fluoride to a hot solution of a calcium salt. It is also possible to produce very satisfactory linings from ground fluorspar alone, substantially all of which is sufficiently finely divided to pass a 300 mesh B.S.F. sieve.

In using such a vessel for the production of uranium the appropriate charge of anhydrous metal halide, e.g. the tetrafluoride, and excess of alkaline earth metal, e.g. calcium, is put into the lined crucible, and trapped air may then be displaced from the charge by passing in argon through a dip pipe. The dip pipe is then removed and in place of it is inserted some starch-potassium chlorate mixture together with a black powder fuse or similar device of known type for initiating the reaction, e.g. a wire which can be electrically heated. The reaction is then initiated by lighting the fuse or electrically heating the wire. On the combustion of the starch-potassium chlorate mixture autothermic reaction sets in immediately and lasts for only a few minutes at most. The reaction vessel is then allowed to cool and the metal is then recovered by emptying the charge out of the reaction vessel, and removing the slag by chipping, crushing and elutriation, or similar means. In some cases the lining of the vessel may come away with the charge, and the vessel will then need relining, though part of the used lining can be reground and used again.

Instead of reacting the halide with calcium, another alkaline earth metal (including magnesium) may be employed. Thus magnesium or magnesium-calcium alloys may be used.

The accompanying drawing shows a vessel prepared as described above. In the drawing 1 indicates a mild steel vessel having a lining 2 of calcium fluoride shaped with a well 3 at the bottom. The charge 5 fills part of the vessel, and a fuse 4 is embedded in the charge. On ignition of fuse 4 autothermic reaction sets in and molten uranium collects in the well 3.

The following examples illustrate but do not limit the invention:

*Example I*

Good quality fluorspar (98% CaF$_2$) was ground and was found to have the following sieve analysis.

| | Percent |
|---|---|
| Retained on a 150 mesh B.S.F. sieve | 51.99 |
| Retained on a 200 mesh B.S.F. sieve | 10.54 |
| Retained on a 240 mesh B.S.F. sieve | 12.56 |
| Retained on a 300 mesh B.S.F. sieve | 7.07 |
| Passed on a 300 mesh B.S.F. sieve | 17.83 |

A smooth cohesive paste was made by mixing 100 parts by weight of this material with 9 parts by weight of water and 20 parts by weight of precipitated calcium fluoride in a Werner Pfleiderer mixer. A fireclay crucible was given a lining of this material 1″ thick with the aid of a wooden former, and then dried at room temperature for 6 hours and then at 200° C. for 15 hours. The lining thus obtained was firm and sound. When cold the lined crucible was charged with a mixture of 2194 grams of anhydrous uranium tetrafluoride containing 75.3% U., and 966 grams of coarse calcium shavings. Air was then displaced from the charge by argon introduced through a pipe dipping to the bottom of the crucible. The pipe was then removed, a starch-potassium chlorate mixture and a black powder fuse put in its place and the fuse was then lighted. Reaction was over in a very short time and the reaction mixture was allowed to cool.

On inverting the cold crucible and tapping, the reaction mixture and most of the fluorspar lining fell out, and the lining was still quite firm. The uranium was present as a disc of metal which was readily separated from the slag and the lining by chipping away the latter and washing the metal.

1620 grams of uranium were thus obtained, analysing as follows:

| | Percent |
|---|---|
| Iron | 98.5 |
| Uranium | 0.11 |
| Calcium | 0.12 |
| Magnesium | 0.006 |
| Aluminium | 0.002 |
| Silicon | 0.070 |

Boron, less than 1 part per million.

*Example II*

2 cwts. of fluorspar of good quality were mixed with 1.5 gallons of a 19% (by wt.) solution of magnesium chloride in water. The moist material was tamped around a wooden former in a mild steel frustoconical canister to give a lining between 2″ and 2½″ thick. The inside of the vessel was then frustoconical with a cylindrical well in the lower portion, 4¾″ in diameter and 3½″ high, the frustum of the cone being 1′ 5″ in diameter at the upper wider end, 9½″ in diameter at the lower end, and 1′ 7″ high. The lined canister was then heated for 3 days at 100° C. to 200° C. and the inside surface was heated for 42 hours by a gas flame to dry it.

A mixture of 25.1 lb. of calcium turnings with 55.3 lb. of anhydrous uranium tetrafluoride containing 75.0% U was then put into the lined vessel, which was then about ⅔ full, and argon was blown in through a dip pipe for 10 minutes. The dip pipe was then removed and a starch-potassium chlorate mixture put in its place and a copper wire inserted also, in contact with this mixture. The latter was then ignited by passing a current through the wire to make it red hot. Reaction was over in 2–3 minutes and the whole was allowed to cool. Slag and metal were then lifted out without destroying the lining. The upper portion of the lining was apparently unaffected, but in the lower portion erosion had occurred to a depth of ½″.

The metal was found to be in the well at the bottom, and was obtained as a cylindrical block weighing 39.3 lb. It analysed as follows:

| | Percent |
|---|---|
| Uranium | 99.4 |
| Iron | 0.13 |
| Calcium | 0.011 |
| Magnesium | 0.011 |
| Aluminium | 0.002 |
| Silicon | 0.014 |

Boron, less than 1 part per million.

I claim:

1. An improved process for the production of uranium by the autothermic reduction of an anhydrous uranium halide with an alkaline earth metal (including magnesium), which comprises initiating the reaction of a mixture of said halide and an excess of said alkaline earth metal contained in an open-topped reaction vessel by locally heating a part of said mixture to reaction temperature, said vessel having in contact with the said mixture a lining of substantial thickness composed of calcium fluoride.

2. An improved process according to claim 1 in which the lining is fashioned in the lower part thereof with a well to receive molten uranium produced in the process.

3. An improved process for the production of uranium by the autothermic reduction of an anhydrous uranium halide with an alkaline earth metal (including magnesium), which comprises initiating the reaction of a mixture of said halide and an excess of said alkaline earth metal contained in an open-topped reaction vessel by locally heating a part of said mixture to reaction temperature, said vessel having in contact with the said mixture a lining of substantial thickness composed of calcium fluoride, which lining is prepared by applying to the interior surface of the vessel a coating of substantial thickness of a plastic mixture of calcium fluoride and water, and subsequently heating the coating in situ until at least the exposed surfaces thereof are substantially anhydrous.

4. An improved process according to claim 3 in which the lining is fashioned in the lower part thereof with a well to receive molten uranium produced in the process.

5. An improved process for the production of uranium by the autothermic reduction of an anhydrous uranium halide with an alkaline earth metal (including magnesium), which comprises initiating the reaction of a mixture of said halide and an excess of said alkaline earth metal contained in an open-topped reaction vessel by locally heating a part of said mixture to reaction temperature, said vessel having in contact with the said mixture a lining of substantial thickness composed of calcium fluoride, which lining is prepared by applying to the interior surface of the vessel a coating of substantial thickness of a plastic mixture of calcium fluoride and an aqueous solution of a chloride of an alkaline earth metal (including magnesium), and subsequently heating the coating in situ until at least the exposed surfaces thereof are substantially anhydrous.

6. An improved process according to claim 5 in which the lining is fashioned in the lower part thereof with a well to receive molten uranium produced in the process.

(References on following page)

References Cited in the file of this patent

UNITED STATES PATENTS

| | | |
|---|---|---|
| 1,437,984 | Marden | Dec. 5, 1922 |
| 1,568,685 | Moore | Jan. 5, 1926 |
| 1,704,257 | Marden et al. | Mar. 5, 1929 |
| 1,893,023 | Fowler | Jan. 3, 1933 |
| 2,206,277 | Crespi | July 7, 1940 |

FOREIGN PATENTS

| | | |
|---|---|---|
| 230,865 | Great Britain | Dec. 10, 1925 |

OTHER REFERENCES

"Industrial and Engineering Chemistry," pages 114–116, February 1926.